United States Patent [19]

Ohlmeyer et al.

[11] 4,263,028
[45] Apr. 21, 1981

[54] FILTER SYSTEM FOR PURIFYING GAS OR AIR STREAMS

[75] Inventors: Manfred Ohlmeyer, Eggenstein-Leopoldshafen; Jürgen Wilhelm, Linkenheim-Hochstetten, both of Fed. Rep. of Germany

[73] Assignee: Kernforschungszentrum Karlsruhe GmbH, Karlsruhe, Fed. Rep. of Germany

[21] Appl. No.: 4,589

[22] Filed: Jan. 18, 1979

Related U.S. Application Data

[63] Continuation-in-part of Ser. No. 720,828, Sep. 7, 1976, abandoned.

[51] Int. Cl.² ............... B01D 53/06; B01D 46/32
[52] U.S. Cl. ......................................... 55/390; 55/79
[58] Field of Search ............... 55/34, 60, 61, 71, 74, 55/77, 79, 99, 181, 390, 387, 474

[56] References Cited

U.S. PATENT DOCUMENTS

| | | | |
|---|---|---|---|
| 1,570,869 | 1/1926 | Thomson et al. | 55/99 |
| 1,798,307 | 3/1931 | Cooper | 55/390 X |
| 1,912,784 | 6/1933 | Miller et al. | 55/390 X |
| 2,636,575 | 4/1953 | Watson | 55/79 |
| 3,429,103 | 2/1969 | Taylor | 55/71 |
| 3,607,133 | 9/1941 | Hirao | 55/390 X |

FOREIGN PATENT DOCUMENTS

| | | |
|---|---|---|
| 2218360 | 10/1973 | Fed. Rep. of Germany . |
| 2239827 | 2/1974 | Fed. Rep. of Germany . |
| 2540141 | 1/1979 | Fed. Rep. of Germany . |
| 981968 | 5/1951 | France . |
| 276736 | 9/1927 | United Kingdom | 55/79 |
| 666715 | 2/1952 | United Kingdom | 55/79 |

*Primary Examiner*—Charles N. Hart
*Assistant Examiner*—E. Rollins Cross
*Attorney, Agent, or Firm*—Spencer & Kaye

[57] ABSTRACT

A filter system is provided for purifying a gas stream by means of flowable or tricklable contact filter material, wherein the stream flows through the filter material and the filter material forms a movable bed. The system contains a filter chamber through which the filter material can flow and which is provided with an inlet opening and an outlet opening for the filter material between which the filter material is conveyed by gravity. The filter system includes deflection means for deflecting the stream, after a first passage of the stream through the filter bed to charge the filter bed for a first time, to a position above where the stream first passed through the filter bed and for conducting the stream at least once again transversely through the filter bed above the first charge so that the filter bed is charged a second time. The filter chamber contains a first opening where the stream enters the filter bed for the first time and is aligned with the deflection means, and a second opening aligned with the deflection means and above the first opening. The second opening is located where the stream leaves the filter bed for the second time, with a partial quantity of the gas stream being able to pass directly through the filter bed from the first opening to the second opening without going through the deflection means. The distance between the upper edge of the first opening and the lower edge of the second opening is at least twice the thickness of the filter chamber.

7 Claims, 1 Drawing Figure

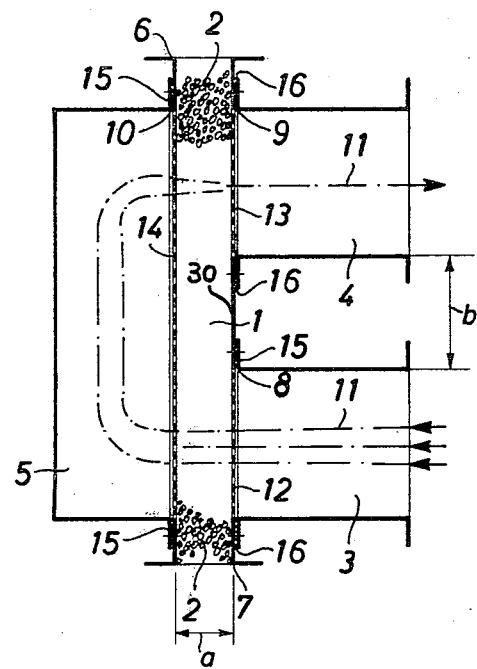

FILTER SYSTEM FOR PURIFYING GAS OR AIR STREAMS

CROSS-REFERENCE TO RELATED APPLICATION

This application is a continuation-in-part of copending Application Ser. No. 720,828, filed Sept. 7, 1976, now abandoned.

BACKGROUND OF THE INVENTION

The present invention relates to a filter system for purifying a gas stream, such as an air stream, for example, an exhaust air containing radioactive materials, by means of flowable or trickable contact filter material, such as, for example, activated carbon. The filter system has a capability of 99.99% rate of filtration which is highly desirable in nuclear plants. The gas stream flows through the filter material and the filter material forms a movable bed. The filter system includes a flow-through filter chamber provided with an inlet and outlet opening for the filter material between which the filter material is conducted continuously or discontinuously by gravity.

Such filter devices serve to remove as completely as possible contaminants carried along by the stream of gas or air. in areas in which radioactive substances are being handled, activated carbon, which may additionally be impregnated, has achieved great significance in this connection. The activated carbon is here poured into the filter chamber through a fill stud, and, after a certain period of dwell in the filter chamber, is removed from the filter chamber through a corresponding discharge stud and replaced by new filter material. Since a minimum degree of decontamination must be assured by a filter system, the exchange of the entire amount of filter material becomes mandatory, even when the filter material is only partially charged with contaminants. The resulting incomplete utilization of the filter material capacity is additionally adversely influenced because the filter material is not only charged with the contaminants for which the filter device is designed, but is additionally charged with foreign substances in the form of already-present impurities in the air from the environment, as well as moisture in the air.

Due to the usually considerable costs for the filter material, this process represents an economically unsatisfactory state. Moreover, when toxic or radioactive substances are involved, care has to be taken that neither the operating personnel nor the environment are endangered during operation of the system and exchange of the filter material.

German Offenlegungsschrift No. 2,239,827 and German Offenlegungsschrift No. 2,218,360 already disclose such filter systems. In these filter systems, however, a time-dependent poisoning in the direction of the air stream does not produce optimum utilization of the filter material, even if the filter bed is subdivided. Further, the full filter bed depth is not always available during exchange of the filter material so that the stream of air must be choked or turned off. If the filter material settles during operation, leaks or cavities, respectively, develop which may cause spreading of contamination.

Filter devices are known in which the filter bed is charged with the stream of gas or air according to the counter-current principle with the aim of optimum utilization of the filter material predominantly in a direction counter to gravity. These filter devices which operate according to the counter-current principle have a very limited field of use because, even with very slow linear flow-through speeds of the stream of gas or air, the filter bed will be partially loosened up and thus cannot assure a minimum degree of decontamination.

SUMMARY OF THE INVENTION

It is a primary object of the present invention to fully use the capacity of the filter material in a filter system which has a flow-through chamber for movement of the filter material.

A further object of the present invention is to have the purified air leaving the filter system in contact, if possible, only with the pure inlet side of the filter material, while the untreated air is to contact only with the contaminated or partially charged side of the filter bed.

Another object of the present invention is to use partially charged filter material to hold the foreign substances and moisture that is present in the gas stream before it is contaminated, so that freshly added filter material can be used completely for the intended absorption of the contaminants for which the filter device is designed.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a filter system for purifying a gas stream by means of a flowable or trickable contact filter material, wherein the stream flows through the filter material and the filter material forms a movable bed, comprising a filter chamber through which the filter material can flow and which is provided with an inlet opening and an outlet opening for the filter material between which the filter material is conveyed by means of gravity, and an improvement wherein the filter system includes deflection means for deflecting the stream, after a first passage of the stream through the filter bed to charge the filter bed for a first time, to a position above where the stream first passed through the filter bed and for conducting the stream at least once again transversely through the filter bed above the first charge so that said filter bed is charged a second time. The filter chamber contains a first opening where the stream enters the filter bed for the first time and is aligned with the deflection means, and a second opening aligned with the deflection means and above the first opening, the second opening being where the stream leaves the filter bed for the second time, with a partial quantity of the gas stream being able to pass directly through the filter bed from the first opening to the second opening without going through the deflection means. The distance between the upper edge of the first opening and the lower edge of the second opening being at least twice the thickness of said filter chamber.

In a further particularly advantageous embodiment of the invention, the filter system includes an inlet chamber for the stream on one side of the filter chamber; and outlet chamber for the stream on the one side of the filter chamber above the inlet chamber; and the deflection means comprises a deflection chamber on an opposite side of the filter chamber and in communication with the inlet chamber through the filter chamber. Preferably, this deflection chamber has a lower portion for receiving the stream from the inlet chamber and an upper portion for directing the stream back through the filter chamber, and the filter chamber is substantially closed at all sides and is provided with at least three passage means for passage of the stream through the filter chamber transversely to the conveying direction of the filter material; the three passage means including: (a) a first passage means on the one side of the filter chamber and which is connected to the inlet chamber, (b) a second passage means on the one side of the filter chamber above the first passage means and connected to the outlet chamber, and (c) a third passage means on the opposite side of the filter chamber which is connected to the deflection chamber, the third passage means permitting passage of the stream from the inlet chamber to the lower portion of the deflection chamber, and after deflection of the stream in an upward direction through the deflection chamber, permitting passage of the stream from the upper portion of the deflection chamber back through the filter chamber. It is further preferred that a foraminous member be placed in each of the passage means to retain the filter material in the filter chamber and that the passage means be connected by gas tight connections with the inlet, outlet and deflection chamber. It is further preferred that the third passage means comprises an opening which extends between the upper and lower portions of the deflection chamber or comprises a first opening at the lower portion of the deflection chamber and a second opening at the upper portion of the deflection chamber.

Preferably, the cross section of the passage means connected to the deflection chamber is at least twice the size of the cross section of the passage means connected to the inlet and outlet chambers, respectively.

In a further advantageous embodiment of the present invention, the filter system includes an inlet chamber for the stream on one side of the filter chamber; a first deflection chamber on an opposite side of the filter chamber and in communication with the inlet chamber through the filter chamber; a second deflection chamber on the one side of the filter chamber, the second deflection chamber being above the inlet chamber and in communication with the first deflection chamber through the filter chamber; and an outlet chamber for the stream on the opposite side of the filter chamber, the outlet chamber being above the first deflection chamber. In this embodiment of the invention, appropriate passage means are provided for connecting the filter chamber to the inlet, outlet and deflection chambers.

In another aspect of the present invention, a filter system is provided for purifying a gas stream wherein the gas stream is first passed through the filter bed, is then deflected to a position above where it first passed through the filter, and then passed through the filter bed a second time at a position above its first through-pass. With this way of filtering a stream of air or gas by means of a flowable filter material, the present invention makes it possible to have a particularly favorable guidance of the stream of air or gas so that the stream charges the filter material substantially from the bottom to the top, and the foreign substances that are present in the stream before the stream is contaminated are removed with the contaminants substantially completely at the bottom portion of the filter bed and the top portion of the filter bed is thus used substantially only for removal of the contaminants. The particular manner of deflection thus makes it possible that, in spite of simple continuous or discontinuous flowing of the filter material from the top to the bottom, optimum separation is assured with full utilization of the capacity of the filter material. The throughput of the filter material in the filter bed can be effected without limitation of the procedure, i.e., the full filter bed depth is always available. By placing the reservoir and collection vessels for the filter material outside of the actual filter system or danger zone, respectively, a simple and rapid exchange of the filter material can be effected, in spite of high degrees of separation, so that the chance of malfunctions is reduced.

It is to be understood that both the foregoing general description and the following detailed description are exemplary, but are not restrictive of the invention.

BRIEF DESCRIPTION OF THE DRAWING

The accompanying drawing illustrates the presently preferred embodiment of the invention and, together with the description, serves to explain the principles of the invention.

The sole drawing FIGURE shows a filter system in the form of a housing constructed according to the teachings of the present invention and having a single deflection.

DESCRIPTION OF THE PREFERRED EMBODIMENT

Referring now to the drawing, there is shown a filter system having a single deflection. The filter system includes a filter chamber 1 to accommodate filter material 2 in the form of a filter bed, an inlet chamber 3, an outlet chamber 4, and a deflection chamber 5. Chambers 3, 4 and 5 are flanged to filter chamber 1 and are connected with the interior of filter chamber 1 via passage means in the side wall 30 of filter chamber 1. As shown in the drawing, filter chamber 1 has a first passage means in the form of a lower inlet opening 8 which is connected to inlet chamber 3. Filter chamber 1 further includes a second passage means in the form of an upper outlet opening 9 which is connected to outlet chamber 4 and a third passage means in the form of an opening 10 which is connected to deflection chamber 5. Deflection chamber 5 has a lower portion which is aligned with and receives a gas stream 11, for example, an air stream, from inlet chamber 1 through filter bed 2 of filter chamber 1. Deflection chamber 5 has an upper portion which directs the gas stream back through filter bed 2 and which is aligned with outlet chamber 3. As shown in the drawing figure, the third passage means in the form of opening 10 extends between the lower and upper portions of deflection chamber 5, but this third passage means can take the form of a first opening at the bottom of filter chamber 1 aligned with inlet chamber 2 and a separate second opening at the top of filter chamber 1 and aligned with outlet chamber 4. When the third passage means comprises first and second openings, these two superimposed openings are smaller than opening 10 and deflection chamber 5 can then be in the form of an elbow pipe of 180° or the like, with the first opening being connected to one end of the elbow pipe and the second opening being connected to the other end of the elbow pipe. Inlet chamber 3 with its associated opening 8 is on the same side of filter chamber 1 as outlet chamber 4 with its associated opening 9 and is disposed below outlet chamber 4 with its associated opening 9 so that untreated air enters at the bottom of filter chamber 1 and purified air leaves at the top of filter chamber 1. The distance b between the upper edge of opening 8 and the lower edge of opening 9 is at least twice the thickness a of the filter chamber 1.

Passage openings 8, 9 and 10 for the stream of air 11 in filter chamber 1 are each covered by a foraminous member, such as a grid, perforated metal sheet or sieve, whose mesh size is smaller than the grain size of filter material 2. As shown in the drawing figure, opening 8 is provided with a foraminous member 12, opening 9 is provided with a foraminous member 13, and opening 10 is provided with a foraminous member 14. Such foraminous members can be placed in a structurally simple manner into the associated openings 8, 9 and 10 and held by means of flanges between filter chamber 1 and chambers 3, 4 and 5 or they can be screwed in.

The inlet and outlet chambers 3 and 4, as well as deflection chamber 5, each are made of a sealed sheet metal housing which is screwed by means of flanges with circular seals 16 to the corresponding opening 8, 9 or 10, respectively, in a gas tight manner. Deflection chamber 5 can be in the form of a conventionally available elbow pipe or curved channel, respectively. The gas stream 11 can be deflected in deflection chamber 5 by means of guide vanes (not shown). The configuration of filter chamber 1 may be rectangular or have any other desired cross section. Often it may be advisable to select the shape of the filter chamber 1 so that its longitudinal section constitutes a polygon whose angles correspond to the slope angle formed by the filling of filter material in filter chamber 1. This produces dependable flow-through of the filter material without dead corners. With such a housing configuration, the inlet, outlet and deflection chambers will then have matching cross members, e.g., have the shape of triangles or polygons. The filter chamber 1 or the filter bed, respectively may additionally be partitioned in its depth, that is, in a direction perpendicular to the direction of flow of the filter material through filter chamber 1, by one or a plurality of screening walls to form partial filter chambers so that passage of the gas stream through the filter material can be effected separately in each partial filter chamber.

Filter chamber 1 is formed by a vertically-disposed sheet metal housing which is closed substantially on all sides and which is provided at its top side with a fill stud 6 and at its bottom side with a discharge stud 7 for filter material 2. Filter material 2 is preferably activated carbon which can be impregnated and which is poured into filter chamber 1 through fill stud 6 to substantially fill the filter chamber. Filter material 2 forms a moving bed and this moving bed can advance through the filter chamber either continuously or discontinuously during operation of the filter system and flow-through of the gas. In continuous movement of the filter bed, fresh filter material is continuously added to filter chamber 1 at the top through fill stud 6 and charged or contaminated filter material is continuously removed from filter chamber 1 at the bottom or through discharge stud 7, with the gas stream passing transversely through the filter material during this continuous movement. In the discontinuous mode of moving the filter material through filter chamber 1, the filter material is maintained in filter chamber 1 without movement from the top to bottom of the filter chamber for a certain period of dwell, with the gas stream passing transversely through the filter material during this dwell period.

After this certain period of dwell in filter chamber 1, the filter material is continuously removed through discharge stud 7 and continuously replaced by new filter material to bring a fresh batch of filter material into filter chamber 1. During this movement of the filter material through filter chamber 1, the gas stream continues to flow transversely through the filter material. After a fresh batch of filter material is introduced into filter chamber 1, the movement of the filter material through filter chamber 1 is terminated, and a new period of dwell is begun. In the discontinuous mode, periods of dwell alternate with periods of movement of the filter material through filter chamber 1. Studs 6 and 7 are connected to inlet and outlet devices (not shown) for the filter material to permit automatic operation of the movement of the filter material in either the continuous or discontinuous mode.

The operation of the filter system shown in the drawing will now be apparent. A gas stream 11 is conducted through filter material 2 or the filter bed, respectively, in a special manner by passing through openings 8, 9 and 10 in wall 30 of filter chamber 1. Gas stream 11, which can be a dust-containing air stream which is contaminated, for example, with radioactive contaminants, such as iodine$^{131}$, flows through lower inlet opening 8 associated with inlet chamber 3 into the filter material 2 and charges the same from the one side with the contaminants which are separated in the carbon filter material 2. After the first transverse passage through filter bed 2, the stream 11, whose contaminant content is indicated by the number of dash-dot lines, is conducted through the lower portion of opening 10 into deflection chamber 5 and is upwardly deflected by 180° in deflection chamber 5. The gas stream 11 is then conducted through the upper portion of opening 10, and again transversely through the filter material 2 at a point above the first passage and in the opposite direction so that the rest of the contaminants in stream 11 are retained in the upper portion of filter bed 2. The purified gas stream 11 of air exits through upper opening 9 into outlet chamber 4 and is removed as purified air.

During passage of gas stream 11 through filter chamber 1 from inlet chamber 3 to deflection chamber 5, a portion of the gas stream will not enter deflection chamber 5, but instead will pass directly through filter chamber 1 in an upward direction and then enters outlet chamber 4. The distance between the upper edge of opening 8 and the lower edge of opening 9 is so related to, e.g., equal to at least twice, the thickness of the filter chamber that even the partial quantity of stream 11 which passes directly through the filter material without going through deflection chamber 5, has at least the same period of dwell in filter material 2 as does the main stream of air, independent of flow rate of the stream, so that it is made impossible that a leakage of air reduces the total separation output of the filter system and no additional sealing measures are required.

The intake and discharge of air or gas, respectively, to or from the chambers 3 and 4 may also be effected from the front to the back or from the top to bottom, i.e., may be connected with a deflection. These embodiments are favorable if a plurality of housings are combined into an assembly of filter systems. For example, by providing a filter system having two deflection chambers, one above the other, the inlet chamber and the intake would be at the front and the outlet chamber and discharge at the back. A plurality of such filter systems could then be arranged in series, with the discharge stream from the outlet chamber at the top of a first filter system being directed to the inlet chamber at the bottom of the next filter system.

The particular advantage of the filter housing according to the invention is mainly the optimum use of the filter material and thus its utilization. The housing can be constructed in the most simple manner with the use of known and proven structural elements. A further advantage is that no moving parts subject to wear are included in the system and that continuous operation produces high dependability. There are no sealing problems which require monitoring. The elimination of margins of safety in the filter bed depth (i.e., the present invention does not require additional filter material for foreign contaminants) results in the requirement for less pressure loss in the filter. Also as can be seen from the drawings, between the inlet and outlet openings for the filter material, the filter bed is uninterfered with by any means, such as partitions, so that the filter material does not contain any irregularities which could enable the gas stream to avoid the filter material. Further, at the last passage location, the purified air comes in contact only with the cleanest filter material and the untreated air only with the filter material with the heaviest charge, i.e., most heavily contaminated.

In preference to other filter systems where the filter bed and the air deflection are accommodated in the same housing, according to the present invention the housings for the intake and discharge of air and for air deflection are rather separately flanged to the housing accommodating the filter bed. Thus, when there is a leak, it is impossible for the gases to be separated to reach the pure air side while avoiding the filter bed. The tightness of the seal can further be detected by monitoring the outer area around the housing. This feature is significantly important when filtering radioactive substances such as iodine[131], as its contaminating pure air is to be strictly avoided.

In summary, the filter of the present invention is a pure transverse stream filter with a certain unavoidable countercurrent component which should be as small as possible in which the gas to be filtered is conducted accurately through a defined layer thickness of absorption material and thus has the same period of dwell at every point.

It will be understood that the above description of the present invention is susceptible to various modifications, changes and adaptations, and the same are intended to be comprehended within the meaning and range of equivalents of the appended claims.

What is claimed is:

1. A filter system for purifying a gas stream by means of flowable or tricklable contact filter material, wherein the stream flows through the filter material and the filter material forms a movable filter bed, comprising a filter chamber through which the filter material can flow and which is provided with an inlet opening and an outlet opening for the filter material between which the filter material is conveyed continuously by means of gravity, the improvement wherein the filter system includes a sole deflection housing having a deflection chamber for deflecting the stream, after a first transverse passage of the stream through the filter bed to charge the filter bed for a first time, to a position above where the stream first passed through the filter bed and for conducting the stream only once again transversely through the filter bed above the first charge so that said filter bed is charged a second time; said filter chamber containing a first opening where the stream enters the filter bed for the first time and aligned with the deflection chamber, and a second opening aligned with the deflection chamber and above the first opening, the second opening being where the stream leaves the filter bed for the second time, with a partial quantity of the gas stream being able to pass directly through the filter bed from the first opening to the second opening without going through the deflection chamber; the distance between the upper edge of the first opening and the lower edge of the second opening being so related to the thickness of said filter chamber that, independent of the flow rate of the gas stream, the partial quantity of the stream which passes directly through the filter bed from the first opening to the second opening without going through the deflection chamber has at least the same period of dwell in the filter bed as does the stream which passes through the deflection chamber; an inlet housing on one side of the filter chamber and having an inlet chamber for the gas stream, the inlet chamber being aligned with the first opening for directing the gas stream into the first opening; an outlet housing likewise on said one side of the filter chamber and having an outlet chamber for the gas stream, the outlet chamber being aligned with the second opening for receiving the gas stream from the second opening; the outlet housing being spaced apart from and above the inlet housing, and the inlet, outlet and deflection housings each being connected separately to the filter chamber; said deflection chamber being on the side of the filter chamber which is opposite to said inlet and outlet chambers and being in communication with said inlet and outlet chambers through the filter chamber, said deflection chamber having a lower portion for receiving said stream from said inlet chamber and an upper portion for directing said stream back through the filter chamber, the filter chamber being substantially closed at all sides with the filter material extending in a continuous uninterrupted manner between the inlet and outlet opening of the filter chamber and being provided with three passage means for passage of said stream through the filter chamber transversely to the conveying direction of the filter material, said three passage means including a first passage means in the form of said first opening, on said one side of the filter chamber and which is in communication with the inlet chamber, a second passage means, in the form of said second opening, on said one side of the filter chamber above the first passage means and which is in communication with said outlet chamber, and a third passage means on the opposite side of the filter chamber and which is in communication with the deflection chamber, said third passage means permitting passage of said stream from the inlet chamber to the lower portion of the deflection chamber, and after deflection of said stream in an upward direction through said deflection chamber, permitting passage of said stream from the upper portion of the deflection chamber back through the filter chamber, said third passage means being an opening which extends between the upper and lower portions of the deflection chamber.

2. The filter system as defined in claim 1 wherein the distance between the upper edge of said first opening and the lower edge of said second opening is equal to at least twice the thickness of said filter chamber.

3. Filter system as defined in claim 1, further including a foraminous member in each of said passage means to retain the filter material in the filter chamber.

4. Filter system as defined in claim 1, wherein said filter chamber is connected by gas tight connections with said inlet housing, said outlet housing and said deflection housing.

5. Filter system as defined in claim 1, wherein the outlet chamber is aligned with the upper portion of the deflection chamber to receive the gas stream from the deflection chamber.

6. Filter system as defined in claim 1, wherein the cross section of the passage means connected to the deflection chamber is at least twice the size of the cross section of the passage means connected to the inlet and outlet chambers, respectively.

7. The filter system as defined in claim 1, wherein the filter material is activated carbon.

* * * * *